United States Patent
Park et al.

(10) Patent No.: US 8,995,329 B2
(45) Date of Patent: Mar. 31, 2015

(54) METHOD FOR DETECTING HARQ/NACK FEEDBACK SIGNAL FROM REPEATER

(75) Inventors: Kyu Jin Park, Anyang-si (KR); Yeong Hyeon Kwon, Anyang-si (KR); Jae Hoon Chung, Anyang-si (KR); Han Gyu Cho, Anyang-si (KR); Sung Ho Moon, Anyang-si (KR)

(73) Assignee: LG Electronics Inc., Seoul (JP)

( * ) Notice: Subject to any disclaimer, the term of this patent is extended or adjusted under 35 U.S.C. 154(b) by 334 days.

(21) Appl. No.: 13/260,256

(22) PCT Filed: Apr. 19, 2010

(86) PCT No.: PCT/KR2010/002426
§ 371 (c)(1),
(2), (4) Date: Sep. 23, 2011

(87) PCT Pub. No.: WO2010/120159
PCT Pub. Date: Oct. 21, 2010

(65) Prior Publication Data
US 2012/0026935 A1    Feb. 2, 2012

Related U.S. Application Data

(60) Provisional application No. 61/170,109, filed on Apr. 17, 2009, provisional application No. 61/171,086, filed on Apr. 21, 2009, provisional application No. 61/222,901, filed on Jul. 2, 2009.

(30) Foreign Application Priority Data

Apr. 19, 2010 (KR) .................. 10-2010-0035916

(51) Int. Cl.
*H04L 1/18*     (2006.01)
*H04L 1/00*     (2006.01)

(52) U.S. Cl.
CPC ....... *H04L 1/1854* (2013.01); *H04L 2001/0097* (2013.01)
USPC ........................................... 370/315; 370/329

(58) Field of Classification Search
CPC ................ H04L 1/1854; H04L 1/1864; H04L 2001/0097; H04L 1/18; H04L 1/1825
USPC ........ 370/310, 315, 328, 329; 455/403, 422.1
See application file for complete search history.

(56) References Cited

U.S. PATENT DOCUMENTS

2008/0045141 A1*  2/2008  Suga .................................. 455/7
2008/0141093 A1*  6/2008  Kwon et al. .................. 714/749

(Continued)

FOREIGN PATENT DOCUMENTS

| CN | 1547816 | 11/2004 |
|---|---|---|
| KR | 1020070113686 | 11/2007 |

OTHER PUBLICATIONS

The State Intellectual Property Office of the People's Republic of China Application Serial No. 201080016991.2, Office Action dated Sep. 11, 2013, 11 pages.

*Primary Examiner* — Obaidul Huq
(74) *Attorney, Agent, or Firm* — Lee, Hong, Degerman, Kang & Waimey

(57) ABSTRACT

A repeater apparatus for detecting a downlink HARQ ACK/NACK feedback signal from a base station is provided. An RF (Radio Frequency) unit receives specific channel configuration information which includes offset information indicating the starting point of a specific channel to which said HARQ ACK/NACK feedback signal is transmitted from the base station and the position of the specific channel allocated for an exclusive use of the repeater apparatus within the specific channel from said start point, and receives the HARQ ACK/NACK feedback signal from the base station for an uplink transmission of the repeater. The processor detects the specific channel allocated for exclusive use of the repeater apparatus based on the received specific channel configuration information thereby decoding the received HARQ ACK/NACK feedback signal.

10 Claims, 7 Drawing Sheets

(56) References Cited

U.S. PATENT DOCUMENTS

| | | |
|---|---|---|
| 2008/0151853 A1* | 6/2008 | Pajukoski et al. ............. 370/342 |
| 2008/0160912 A1 | 7/2008 | Kim et al. |
| 2008/0168321 A1 | 7/2008 | Lim et al. |
| 2008/0293424 A1* | 11/2008 | Cho et al. ...................... 455/450 |
| 2009/0010198 A1* | 1/2009 | Boariu et al. ................. 370/315 |
| 2009/0055703 A1 | 2/2009 | Kim et al. |
| 2009/0175233 A1* | 7/2009 | Ojala et al. .................... 370/329 |
| 2010/0008282 A1* | 1/2010 | Bhattad et al. ................ 370/312 |

* cited by examiner

METHOD FOR DETECTING HARQ/NACK FEEDBACK SIGNAL FROM REPEATER

CROSS-REFERENCE TO RELATED APPLICATIONS

This application is a 371 U.S. national stage application of International Application No. PCT/KR2010/002426, filed on Apr. 19, 2010, which claims the benefit of earlier filing date and right of priority to Korean Application No. 10-2010-0035916, filed on Apr. 19, 2010, and claims the benefit of U.S. Provisional Application Ser. Nos. 61/222,901, filed on Jul. 2, 2009, 61/171,086, filed on Apr. 21, 2009, and 61/170,109, filed on Apr. 17, 2009, the contents of all of which are incorporated by reference herein in their entireties.

TECHNICAL FIELD

The present invention relates to a wireless communication system and more particularly to a method for detecting an HARQ ACK/NACK feedback signal and a relay node apparatus using the method.

BACKGROUND ART

If a channel condition between a base station and a UE is poor, a relay node (RN) may be installed between the base station and the UE to provide a radio channel having better channel conditions to the UE. An RN may also be installed in a cell edge region having a poor channel condition to provide a higher-speed data channel, extending a cell service region. Thus, the RN has been widely used to reduce radio dead zone in a wireless communication system.

While conventional relay schemes only employ a repeater function which merely amplifies signals, recent relay schemes have been developed into more intelligent forms. The RN technology is essential to increase the service coverage and improve throughput while reducing costs associated with increasing the number of base stations and maintenance costs of a backhaul network in a next generation mobile communication system. With the increasing development of RN technology, there is a need for such new wireless communication systems to support RNs used in the conventional wireless communication system.

In a 3rd Generation Partnership Project Long Term Evolution (3GPP LTE) system, as an RN has adopted a function to forward link connection between a base station and a User Equipment (UE), two links having different attributes have been respectively applied to uplink and downlink carrier frequency bands. A connection link set between a base station and a RN is defined as a backhaul link. Frequency Division Duplex (FDD) or Time Division Duplex (TDD) transmission using downlink resources is referred to as backhaul downlink and FDD or TDD transmission using uplink resources is referred to as backhaul uplink.

FIG. 1 illustrates a configuration of a relay backhaul link and a relay access link in a wireless communication system.

As shown in FIG. 1, the RN may receive information from a base station (or eNode B (eNB)) through a relay backhaul downlink and may transmit information to a base station through a relay backhaul uplink. The RN may transmit information to a UE through the relay access downlink and may receive information from a UE through the relay access uplink.

In the case where an LTE-Advanced (LTE-A) system, which has improved the LTE system which is a mobile communication system, supports an RN, a base station needs to feed an ACK/NACK back to the RN in response to uplink transmission to the base station from the RN. However, there have been no methods for transmitting an ACK/NACK feedback from a base station in response to uplink transmission from an RN in an LTE-A system and there also have been no designs and suggestions associated with channel allocation for ACK/NACK feedback. However, in the case where the LTE-A system supports an RN, there is a need to design a downlink ACK/NACK feedback from a base station to the RN and to design channels for the downlink ACK/NACK feedback.

DISCLOSURE

Technical Problem

An object of the present invention devised to solve the problem lies in providing a method for detecting an HARQ ACK/NACK feedback signal in a RN.

Another object of the present invention devised to solve the problem lies in providing an RN apparatus for detecting an HARQ ACK/NACK feedback signal.

Objects of the present invention are not limited to those described above and other objects will be clearly understood by those skilled in the art from the following description.

Technical Solution

The object of the present invention can be achieved by providing a method for a Relay Node (RN) to detect a Hybrid Automatic Repeat reQuest (HARQ) ACKnowledgement/Negative ACKnowledgement (ACK/NACK) feedback signal in a mobile communication system, the method including receiving, from an evolved Node B (eNode B), specific channel configuration information including a starting point of a specific channel in which the HARQ ACK/NACK feedback signal is transmitted and offset information indicating, with respect to the starting point of the specific channel, a position in the specific channel at which a specific channel dedicated to the RN is allocated, receiving, from the eNode B, an HARQ ACK/NACK feedback signal for uplink transmission, and detecting the specific channel dedicated to the RN based on the received specific channel configuration information and decoding the received HARQ ACK/NACK feedback signal.

Preferably, the method may further include receiving predefined code index information for the HARQ ACK and/or HARQ NACK signal from the eNode B, and determining whether the received HARQ ACK/NACK feedback signal is an ACK or a NACK based on the code index information and a code index applied to the received HARQ ACK/NACK feedback signal.

The object of the present invention can also be achieved by providing a Relay Node (RN) apparatus for detecting a Hybrid Automatic Repeat reQuest (HARQ) ACKnowledgement/Negative ACKnowledgement (ACK/NACK) feedback signal in a mobile communication system, the RN apparatus including a Radio Frequency (RF) unit for receiving, from an evolved Node B (eNode B), specific channel configuration information including a starting point of a specific channel in which the HARQ ACK/NACK feedback signal is transmitted and offset information indicating, with respect to the starting point of the specific channel, a position in the specific channel at which a specific channel dedicated to the RN apparatus is allocated and receiving, from the eNode B, an HARQ ACK/NACK feedback signal for uplink transmission by, and a processor for detecting the specific channel dedicated to the RN apparatus based on the received specific channel configuration information and decoding the received HARQ ACK/NACK feedback signal.

Preferably, the RF unit may receive code index information preset for the HARQ ACK and/or HARQ NACK signal from the eNode B and the processor may determine whether the received HARQ ACK/NACK feedback signal is an ACK or a NACK based on the code index information and a code index applied to the received HARQ ACK/NACK feedback signal.

Advantageous Effects

According to the present invention, in an LTE-A system, RNs can efficiently receive an HARQ ACK/NACK feedback signal that an eNode B transmits in response to uplink transmission from the RNs.

In addition, the RN can efficiently receive an HARQ ACK/NACK feedback signal according to new HARQ ACK/NACK channel structures and transmission methods for RNs that are suggested in the present invention.

Advantages of the present invention are not limited to those described above and other advantages will be clearly understood by those skilled in the art from the following description.

DESCRIPTION OF DRAWINGS

The accompanying drawings, which are included as a part of the detailed description of the invention for better understanding of the invention, provide embodiments of the invention and illustrate the spirit of the invention together with the detailed description.

BEST MODE

Figure 1:
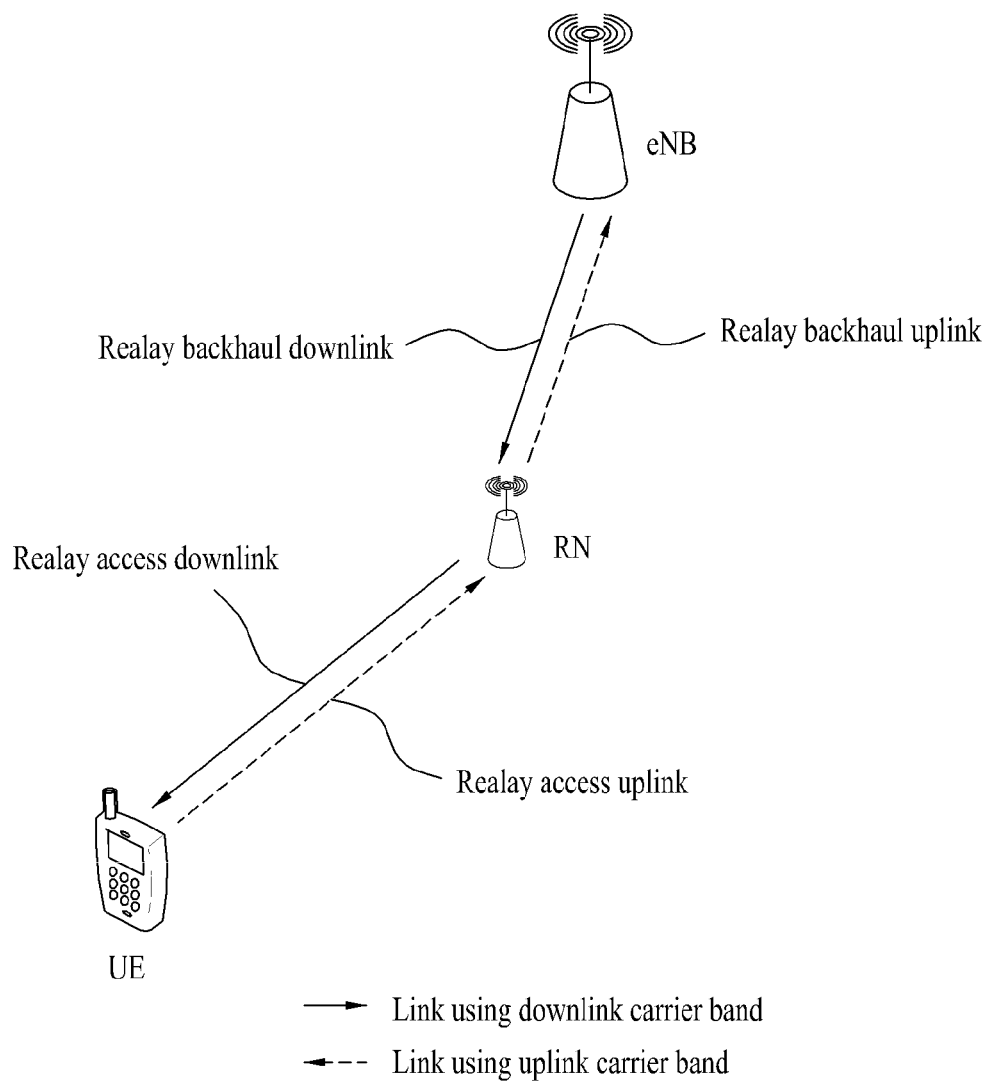
FIG. 1 illustrates a configuration of a relay backhaul link and a relay access link in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case where the mobile communication system is a 3GPP LTE system, the following descriptions, except those specific to 3GPP LTE, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "terminal" or "User Equipment (UE)" is used to generally describe any mobile or stationary user device such as a Mobile Station (MS) or an Advanced Mobile Station (AMS). In addition, the term "Base Station (BS)" is used to generally describe any network node that communicates with the terminal such as a Node B, an evolved Node B (eNode B, or eNB), or an Access Point (AP). The Relay Node (RN) may also be referred to as a Relay Station (RS) or a relay.

In a mobile communication system, a UE may receive information from an eNode B in downlink and may transmit information to the eNode B in uplink. Information transmitted or received by the UE includes data and various control information. Various physical channels are provided according to types and purposes of information transmitted or received by the UE.

As a feedback of HARQ ACK/NACK (also referred to as an ACK/NACK for short) in response to uplink PUSCH transmission from a UE in an LTE system, the eNode B may transmit a downlink HARQ ACK/NACK through a physical HARQ indicator channel (PHICH) allocated to a physical downlink control channel (PDCCH) region in a downlink subframe. Here, the PHICH is a channel allocated to transmit an ACK/NACK signal indicating whether or not an uplink transmission has been successfully received by an eNode B.

A method of allocating a dedicated HARQ ACK/NACK channel to every UE in a cell has a problem of increasing downlink resource overhead. That is, this method results waste of HARQ ACK/NACK channel resources allocated to a UE which has not actually performed uplink transmission to an eNode B through a PUSCH of an uplink subframe.

Thus, the LTE system allocates a PHICH based on actually performed PUSCH transmission. This can be conceptually explained as follows. Orthogonal PHICH entities in the time, frequency, code domains in which ACK/NACK feedback signaling for a single code block is possible are obtained based on a physical resource block (PRB) index of a PUSCH that the UE uses for uplink transmission and a PHICH of a subframe may be constructed of a set of the PHICH entities.

Figure 2:
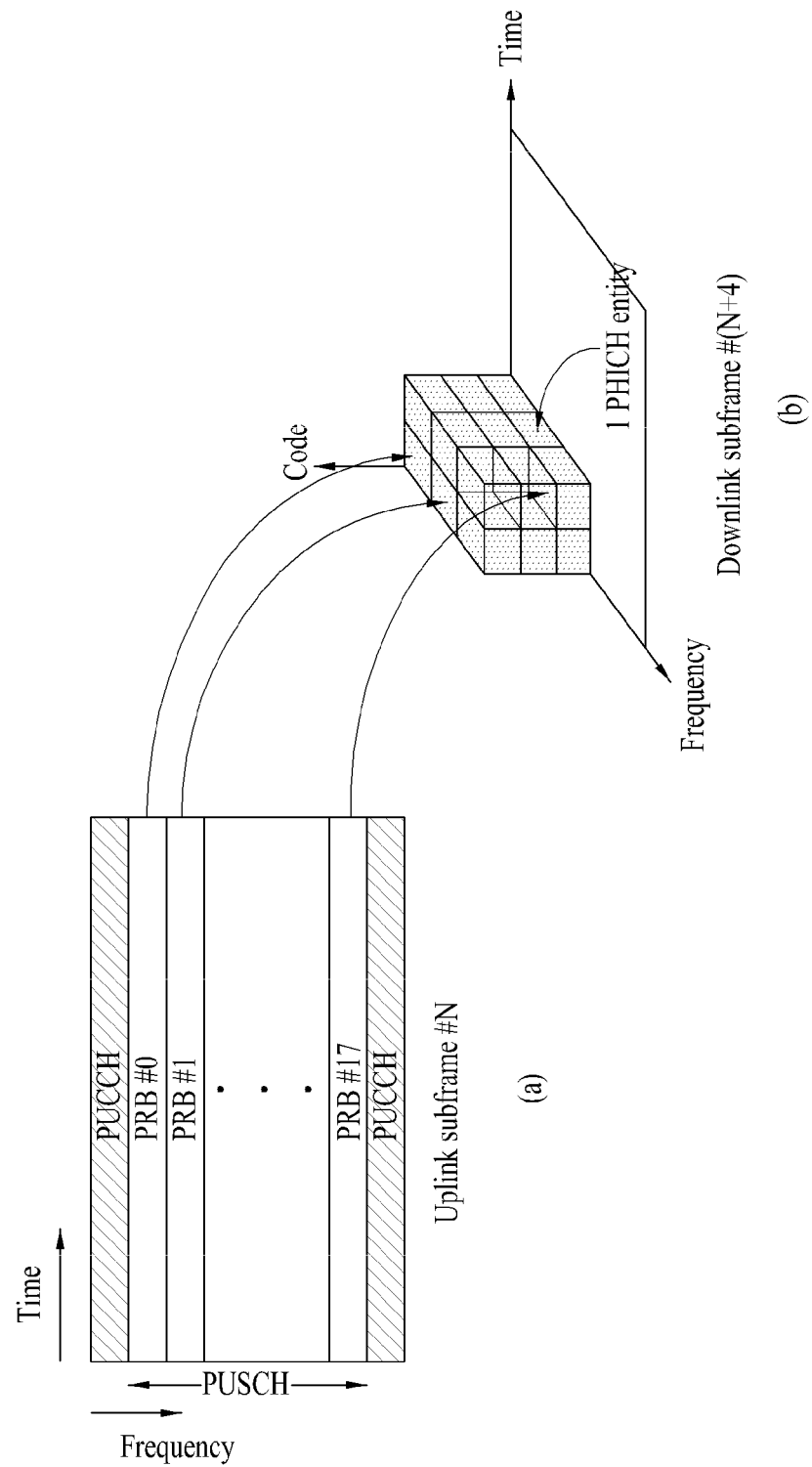
FIG. 2 illustrates a structure of a specific uplink subframe and a PHICH region in a specific downlink subframe corresponding to each PRB index in the case where uplink data transmission is performed in units of PRB indices in an LTE system.

FIG. 2 illustrates a structure of a specific uplink subframe and a PHICH region in a specific downlink subframe corresponding to each PRB index in the case where uplink data transmission is performed in units of PRB indices in an LTE system.

As shown in FIG. 2, an eNode B transmits a downlink HARQ ACK/NACK feedback for a UE, which has performed uplink transmission, through a PHICH entity mapped to each PRB index in a PUSCH used by the UE. In the case where a specific UE has performed uplink transmission through a plurality of PRBs, an HARQ ACK/NACK feedback is provided through a PHICH index corresponding to the lowest PRB index. For example, in the case where uplink transmission has been performed through each of the PRB indices 2, 3, and 4, the eNode B may provide an ACK/NACK feedback through a PHICH entity mapped to the PRB index 2.

Although uplink transmission is performed in units of PRB indices in the example of FIG. 2, the method may be equally applied to the case where uplink transmission is performed in units of VRB indices.

Figure 3:
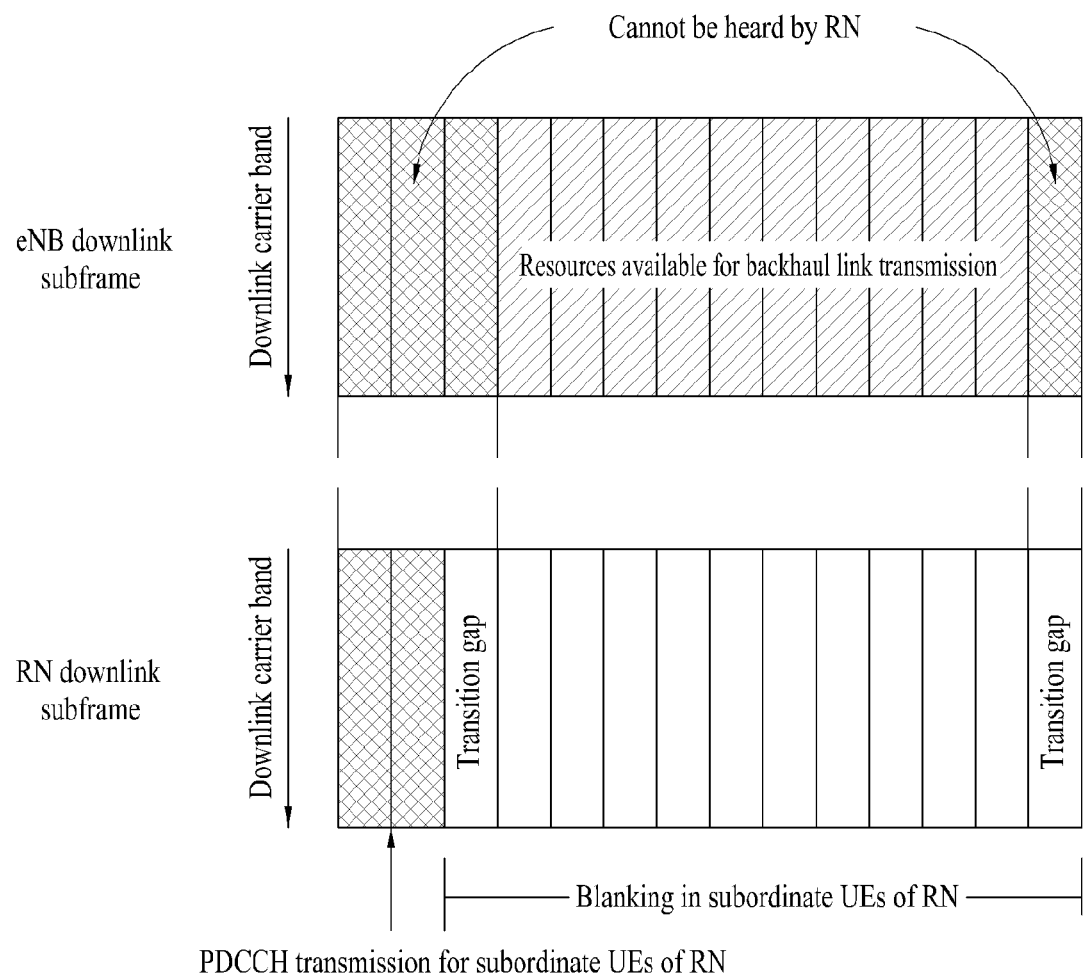
FIG. 3 illustrates an exemplary configuration of a downlink subframe in an eNode B and an RN when the subframe is a fake-MBSFN subframe.

FIG. 3 illustrates an exemplary configuration of a downlink subframe in an eNode B and an RN when the subframe is a fake-MBSFN subframe.

As shown in FIG. 3, the RN may transmit control information or the like to UEs in downlink through a PDCCH which occupies 2 Orthogonal Frequency Division Multiplexing (OFDM) symbols in a downlink subframe which has been set as a fake Multicast Broadcast Single Frequency Network (fake-MBSFN) subframe. Here, in order to receive control information, data or the like from the eNode B, the UE needs a transition gap (the 3rd OFDM symbol and the 14th OFDM symbol) for switching from a transmission mode to a reception mode. The RN may receive data or the like from the eNode B through a range of the 4th to 11th OFDM symbols (through a total of 9 OFDM symbols).

Especially when a fake-MBSFN subframe for downlink backhaul link transmission is set in an RN in order to support RNs in an LTE-A system which has improved an LTE system which is an example of a mobile communication system, each RN may fail to receive, through a PHICH, a downlink Acknowledgement/Negative Acknowledgement (ACK/NACK) feedback which indicates whether or not an eNode B has successfully received an uplink backhaul link transmission from a UE to the eNode B as shown in FIG. 3. Accordingly, in an LTE-Advanced (LTE-A) system, there is a need to additionally define a downlink ACK/NACK feedback channel for RNs for the backhaul link.

The following is a description of various methods for an eNode B to provide an ACK/NACK feedback through a downlink backhaul link in response to an uplink backhaul traffic transmission from an RN to the eNode B. Especially, the following description will be given of various embodiments of allocation of an ACK/NACK channel and a structure of a downlink control channel according to a downlink backhaul link structure. It is possible to consider a method for allocating an RN-specific downlink ACK/NACK channel without using a conventional PHICH structure in which orthogonal resources are allocated in the time, frequency, and code domains for each Resource Block (RB) index used for physical uplink shared channel (PUSCH) transmission.

A backhaul subframe may be allocated for downlink/uplink backhaul traffic transmission and reception in order to support RNs in the LTE-A system and backhaul transmission and reception between the eNode B and the RN may be performed through a corresponding downlink/uplink backhaul subframe. As shown in FIG. 3, the RN cannot receive a PDCCH from the eNode B (specifically, the first, second, and third OFMA symbols in a downlink subframe from the eNode B) and therefore there is a need to define a new downlink control channel (Relay-PDCCH) for the RN, which will be referred to as an R-PDCCH. Although the new downlink control channel for the RN will be referred to as an R-PDCCH, it may also be referred to as a different word.

The eNode B may transmit downlink/uplink scheduling information and downlink HARQ ACK/NACK feedback for an RN to the RN through an R-PDCCH which has been newly defined for RNs. However, backhaul link characteristics between the eNode B and the RN may be different from access link characteristics between the eNode B (or RN) and the UE. Especially, unlike traffic of the access link having burst characteristics, traffic of the backhaul link is highly likely to be present in a backhaul subframe allocated to each RN. In addition, the volume of traffic transmitted through the backhaul link may be great since the traffic transmitted through the backhaul link is traffic aggregated for UEs that are supported by the RN. Also, in an uplink backhaul subframe of a macrocell, backhaul traffic transmitted by RNs is highly likely to be transmitted in a Frequency Division Multiplexing (FDM) manner together with uplink access link traffic transmitted by UEs that are directly connected to the macrocell eNode B.

Accordingly, even in an uplink backhaul subframe, PRBs in all PUSCHs are not necessarily used for uplink backhaul transmission of RNs. Therefore, allocating a dedicated HARQ ACK/NACK channel for each RN may be more efficient than allocating PHICH resources for RNs for each PRB index of a PUSCH as resources for a PHICH are allocated in the conventional LTE system. That is, downlink HARQ ACK/NACK channels for RNs may be constructed of a set of HARQ ACK/NACK channels dedicated respectively for the RNs. Here, a dedicated HARQ ACK/NACK channel allocated for each RN is referred to as an R-PHICH although it may also be referred to as a different word.

<Downlink HARQ ACK/NACK Transmission from eNode B Through R-PHICH>

Figure 4:
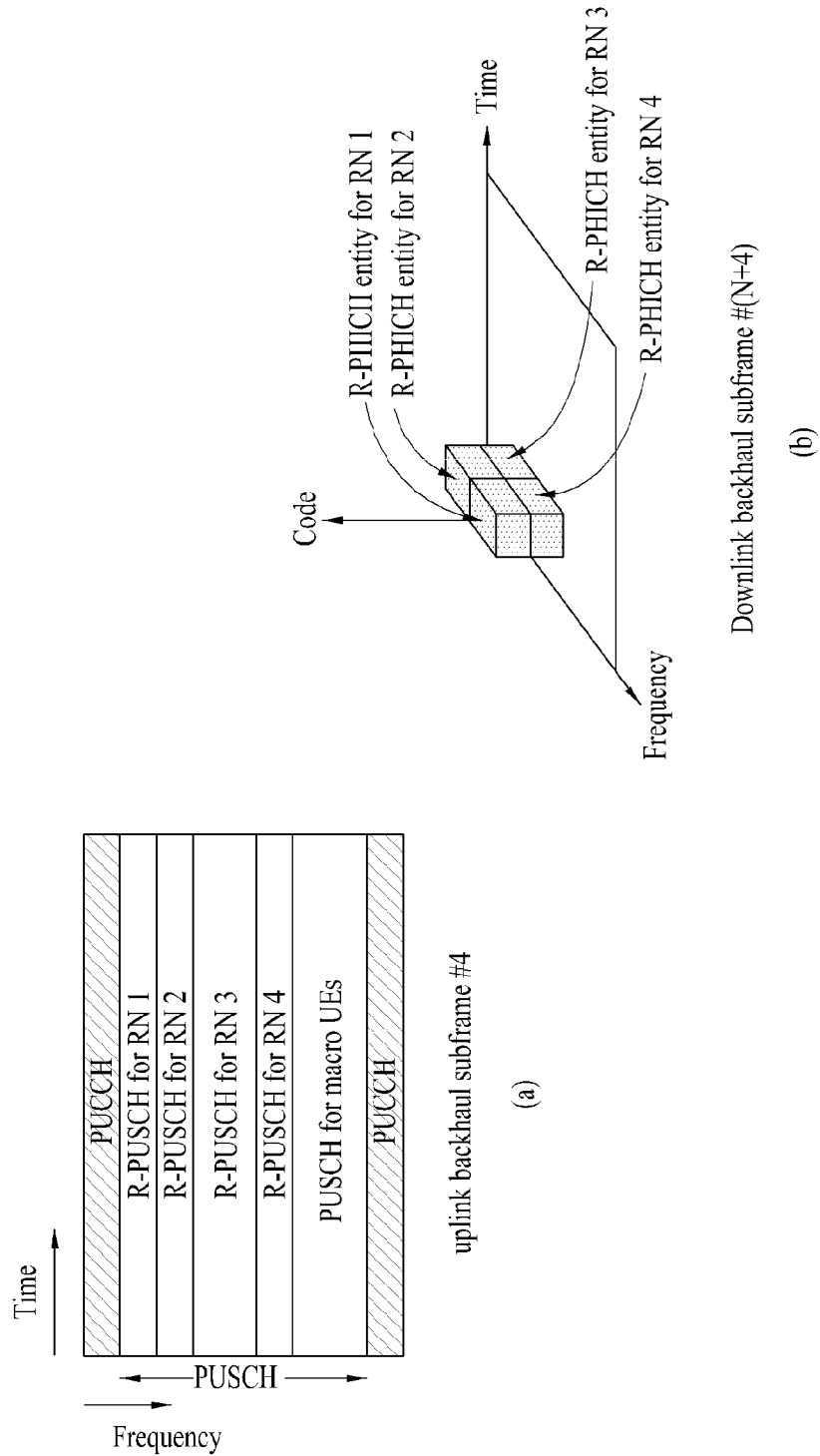
FIG. 4 illustrates a structure of an uplink backhaul subframe in an LTE-A system and a structure of a specific downlink backhaul subframe to which an R-PHICH channel is allocated for transmission of an HARQ ACK/NACK signal from an eNode B in response to uplink information transmitted from an RN.

FIG. 4 illustrates a structure of an uplink backhaul subframe in an LTE-A system and a structure of a specific downlink backhaul subframe to which an R-PHICH channel is allocated for transmission of an HARQ ACK/NACK signal from an eNode B in response to uplink information transmitted from an RN.

Referring to FIG. 4(a), an R-PUSCH for uplink data transmission for each RN may be allocated in a specific uplink backhaul subframe. That is, respective R-PUSCHs may be allocated to an RN 1, an RN 2, an RN 3, . . . , and an RN N. The R-PUSCHs allocated for the RNs may be allocated within a PUSCH in an LTE system. The respective R-PUSCHs allocated for the RNs may be allocated to different frequency bands.

A downlink backhaul subframe shown in FIG. 4(b) is a subframe corresponding to an HARQ timing for uplink backhaul transmission through the specific uplink backhaul subframe shown in FIG. 4(a). An R-PHICH entity within the downlink backhaul subframe may be dedicated to one RN and the number of R-PHICH entities which constitute the R-PHICH is equal to the number of RNs that are supported by a backhaul subframe to which the R-PHICH has been allocated. RPHICH entities corresponding respectively to the RNs may be orthogonally allocated in the time, frequency, and code domains.

The eNode B may notify each RN of dedicated R-PHICH entity allocation information through higher layer signaling during an initial setup procedure or an update procedure. That is, each RN may set a downlink HARQ ACK/NACK channel for an uplink backhaul transmission by receiving a Radio Resource Control (RRC) signaling. The eNode B may notify each RN of dedicated R-PHICH configuration information through an R-PDCCH, a broadcast channel for the RN, higher layer signaling, or the like.

The following is a description of information included in the R-PHICH configuration information. First, a description will be given of configuration information of an R-PHICH that an eNode B transmits in the case where an R-PHICH allocated to each RN is located within an R-PDCCH.

One R-PHICH entity may have an implicitly fixed size in the time and frequency domains. For example, one R-PHICH entity may be allocated to 3 subcarriers and 2 OFDM symbols. Configuration information of the R-PHICH may include a Control Channel Element (CCE) index that is used as an R-PHICH in an R-PDCCH, a VRB/PRB index which is a starting point in a logical/physical area of the R-PHICH, size information of the R-PHICH, and the like. The configuration information of the R-PHICH may include not only the starting point information of the R-PHICH but also offset information indicating, with respect to the starting point, the position at which a dedicated R-PHICH entity for the corresponding RN is allocated. The R-PHICH configuration information may further include information regarding a code index for the R-PHICH. A code index for an ACK signal and a code index for an NACK signal may be separately indicated (or notified) as code index information. In a different method, a single code index for an ACK signal or a NACK signal may be indicated (or notified) and, in the case where a received signal is a NACK or ACK signal, the signal may be processed in a Discontinuous Transmission (DTx) mode.

Unlike the above method, one R-PHICH entity may have several sizes as different options rather than an implicitly fixed size in the time and frequency domains. For example, one R-PHICH entity may be allocated to 6 subcarriers and 1 OFDM symbols in one option and may be allocated to 3 subcarriers and 2 OFDM symbols in a different option. That is, in the case where one R-PHICH entity have different sizes according to options, the configuration information of the R-PHICH may include information regarding an R-PHICH entity option in addition to the information which is included in the R-PHICH configuration information when the size of one R-PHICH entity has an implicitly fixed size.

In the case where time and frequency resources are commonly used for each RN, the eNode B may transmit R-PHICH configuration information to each RN through an R-PDCCH, a broadcast channel for the RN, higher layer signaling, or the like. In this case, the ACK/NACK feedback of each RN may be discriminated in the code domain and the corresponding code may be implicitly determined by a Cell-Radio Network Temporary ID (C-RNTI) of the RN within a macrocell or a Cell Identifier (ID) of the RN.

Then, in the case where an R-PHICH and an R-PDCCH allocated to each RN are separately located in the time, frequency, and code domains, the eNode B may allocate an R-PHICH entity to each RN as described above.

One RN may transmit a plurality of code blocks to the eNode B through multiple layers through an uplink backhaul subframe. In response to transmission of a plurality of code blocks through multiple layers from an RN, the eNode B may bundle HARQ ACK/NACK feedbacks into one ACK/NACK and feed the ACK/NACK back to the RN through an R-PHICH. That is, for example, in the case where the eNode B has successfully received all of a plurality of transmitted code blocks, the eNode B may bundle ACK signals into a single ACK signal and feed the single ACK signal back to the RN. Optionally, the eNode B may transmit the HARQ ACK/NACK signal through an R-PHICH through multiple layers in the same manner as uplink transmission. In this case, the eNode B may allocate one R-PHICH entity to each RN in the same manner as described above or may allocate the same number of R-PHICH entities as the number of uplink code blocks. That is, one R-PHICH entity may be allocated to each layer in one RN.

<Transmission of R-PHICH Configuration Information Using Downlink or Uplink Grant in R-PDCCH>

As another method for an eNode B to transmit a downlink HARQ ACK/NACK feedback through a backhaul link, it is possible to consider a method in which a downlink HARQ ACK/NACK feedback field is included in a downlink grant or an uplink grant. That is, the eNode B may incorporate a downlink HARQ ACK/NACK feedback field into a downlink or uplink grant field for an RN included in an R-PDCCH of a downlink backhaul subframe set at the downlink HARQ ACK/NACK feedback timing and transmit the downlink or uplink grant including the downlink HARQ ACK/NACK feedback field to the RN.

In this case, the size of the downlink ACK/NACK field may vary depending on the number of code blocks. The number of code blocks may be increased through spatial multiplexing or as an RN configures a wireless backhaul through carrier aggregation. That is, the number of bits of ACK/NACK resources is increased when a backhaul is set through multiple carriers. The number of bits of ACK/NACK resources may be represented as a group of bit fields of the grant. The grant bit fields may be configured as bit fields that are allocated as a multiple of the number of carriers, which may become scheduled component carriers, rather than the number of scheduled component carriers. The purpose of this is to reduce the number of times blind decoding is performed when a PDCCH is detected for detecting an ACK/NACK signal or an R grant by limiting the number of ACK/NACK fields regardless of the number of carriers that are used by the RN or regardless of the MIMO mode. Here, the corresponding field may indicate an ACK signal when the field has a value of '1' while the field indicates a NACK signal (or DTX) when the field has a value of '0'. Conversely, the corresponding field may also indicate a NACK signal (or DTX) when the field has a value of '1' while the field indicates an ACK signal when the field has a value of '0'.

<ACK/NACK Transmission from eNode B to RN Based on ACK/NACK Codeword>

In the case where the eNode B transmits an HARQ ACK/NACK signal to an RN, the number of HARQ ACK/NACK bits that the eNode B needs to transmit changes depending on whether the number of the HARQ ACK/NACK bits is small or the number of the HARQ ACK/NACK bits is great due to carrier aggregation or depending on whether the number of RNs is great. In the above technology, HARQ ACK/NACK channels are additionally defined in association with change of the number of HARQ ACK/NACK bits and the eNode B notifies the RNs of the defined HARQ ACK/NACK channels.

Unlike this method, it is possible to consider a method in which the eNode B defines and transmits such a group of HARQ ACKs/NACKs as a single codeword. That is, an HARQ ACK/NACK control codeword corresponding to a specific payload length may be defined and a bit field to be used by a specific RN may be shared between the eNode B and the RN through a cooperation procedure between the eNode B and the RN.

For example, let us assume that an ACK/NACK codeword which can accommodate 28 ACK/NACK bits is present. The eNode B may attach a Cyclic Redundancy Check (CRC) to the 28-bit ACK/NACK to create a 44-bit ACK/NACK. The eNode B creates a payload by masking the CRC with an ID which allows the RN and the eNode B to identify an ACK/NACK codeword for the RN and then performs channel encoding (convolution encoding or block encoding) on the payload. Then, the eNode B may perform scrambling on the ACK/NACK codeword ID in an overall manner. The RN can identify the ACK/NACK codeword allocated to the RN using the RN ACK/NACK codeword ID without errors. Then, the RN may decode the ACK/NACK codeword and receive specific bit positions in the decoded bits as an ACK/NACK signal for uplink traffic transport blocks that the RN has transmitted. The codeword may also be defined as an uplink ACK/NACK codeword for downlink traffic in the case where it is an ACK/NACK codeword transmitted by the RN.

Here, although ACK/NACK signals to be transmitted to the RN through a single carrier may be grouped to create an ACK/NACK control codeword, ACK/NACK signals to be transmitted to the RN through multiple uplink carriers may also be grouped to create an ACK/NACK control codeword. As described above, each RN may identify ACK/NACK signals for the RN through different ACK/NACK bits indicated by the eNode B. Although it is preferable that ACKs/NACKs for one RN be transmitted in a single ACK/NACK codeword, the ACK/NACK signals may also be transmitted to the RN using multiple ACK/NACK codewords in the case where the bit field positions are insufficient. A bit field value of '1' may be allocated to the ACK signal when the eNode B has received the uplink traffic transport block without an error while a bit field value of '0' is allocated to the NACK signal (or DTX) when the eNode B has not received the uplink traffic transport block without an error. Here, a bit field value of '0' may also be allocated to the ACK signal while a bit field value of '1' is allocated to the NACK signal.

In the case where an ACK/NACK codeword is defined, there is a need to define a channel for transmitting the ACK/NACK codeword. In the case of the ACK/NACK codeword, a number of RNs may simultaneously use a single ACK/NACK codeword or one RN may use the entirety of a single ACK/NACK codeword depending on the length of the payload. In the case where one RN uses the entirety of a single ACK/NACK codeword, it is preferable that a resource position optimal for the RN be defined (or selected in a frequency selective manner) and then be transmitted.

However, it may be preferable that, in consideration of the characteristics of the control channel, the position be fixed to a specific position rather than be changed each time. To accomplish this, the ACK/NACK codeword requires a common control channel region in which the ACK/NACK codeword can be transmitted. The position of the common control channel region may be identified by detecting a specific search region (or search space) in a blind decoding scheme or may be previously shared between the RN and the eNode B through control signaling or may be automatically mapped to a specific position according to the ACK/NACK codeword index. In the case where the position of the common control channel region is identified by detecting a specific search region in a blind decoding scheme, the specific search region is defined as the number of consecutively used CCEs and the positions of the CCEs and natural rate-matching effects are achieved in codeword transmission.

The blind decoding search region (or search space) of the RN may be multiplexed with a different downlink or uplink shared channel in an FDM manner and may be discriminated from other TDM-based control channels in a TDM manner. In the case of the blind decoding search region, a set of subcarriers through which the ACK/NACK codeword is transmitted may change as the position of the region used by the RN changes. However, when such a control channel region is configured, it is preferable that the control channel be defined and configured only with a short burst, i.e., within partial OFDM symbols in one subframe (for example, 1 to 3 OFDM symbols or more than 3 OFDM symbols as circumstances require), taking into consideration ACK/NACK decoding latency in the RN. In this case, the RN can secure a sufficient time to process the ACK/NACK codeword and to prepare for subsequent transmission.

<Method of Allocating R-PHICH According to Backhaul Subframe Structure>

Figure 5:
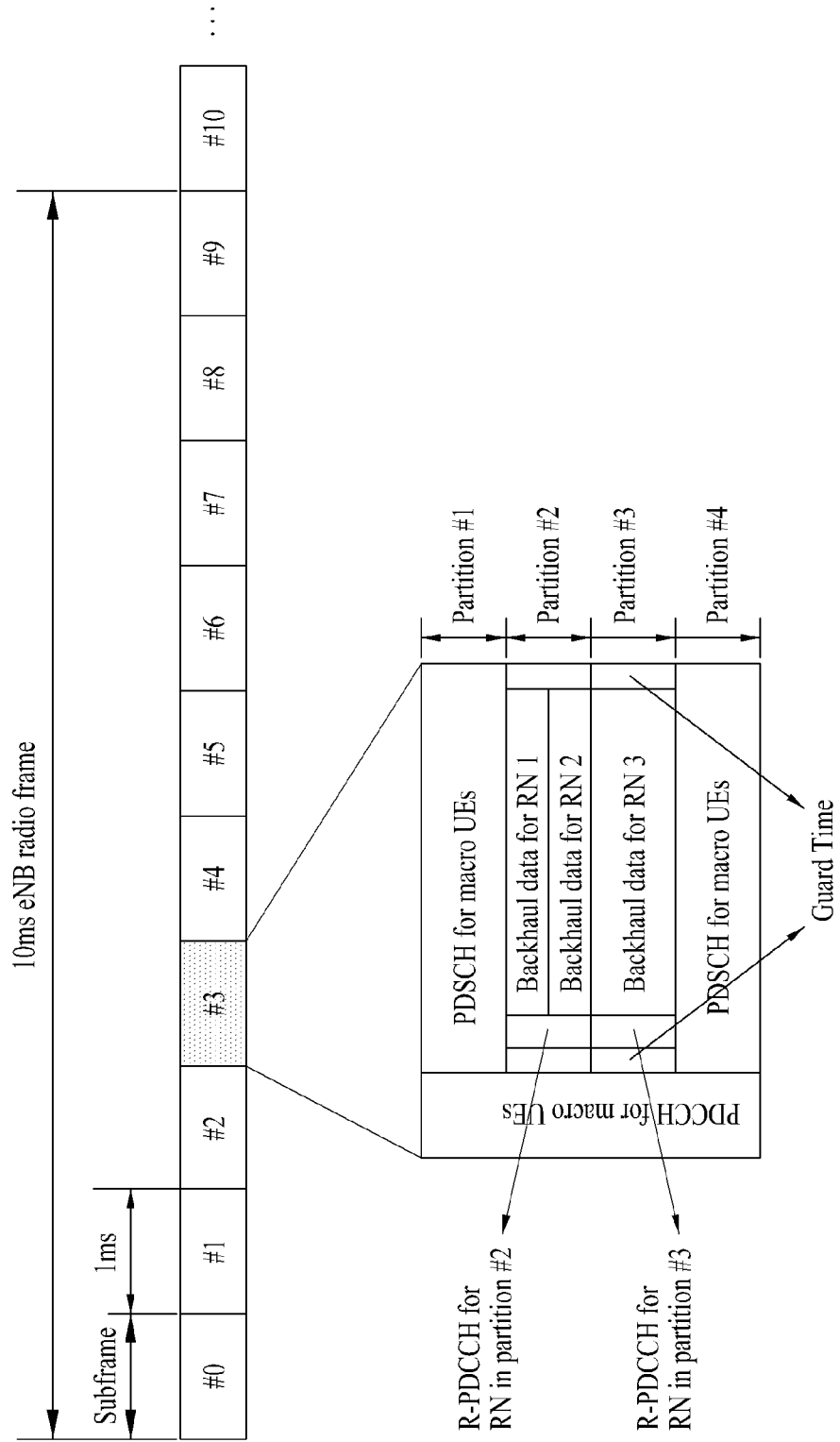
FIG. 5 illustrates an example of a backhaul subframe structure including an R-PDCCH for an RN.

FIG. 5 illustrates an example of a backhaul subframe structure including an R-PDCCH for an RN.

As shown in FIG. 5, in a subframe of index 3 which has been set as a backhaul subframe, the entire PDSCH may be divided into partitions, each including one or more PRBs. Depending on the backhaul traffic volume for each RN and traffic volume for macro UEs, channel quality, or the like, a specific one of the partitions in the PDSCH may be dynamically used as a relay zone for backhaul link transmission or may be used as a PDSCH for macro UEs. The following is a brief description of a method for allocating an R-PHICH according to a backhaul subframe structure.

The eNode B may always fix a specific partition as a relay zone for backhaul link transmission. As shown in FIG. 5, the eNode B may allocate a partition 1 and a partition 2 as relay zones for RNs. When each RN performs initial setup or update, the eNode B may notify each RN of partition configuration information and information regarding for the relay zone through higher layer signaling or the like.

In addition, the eNode B may transmit relay zone configuration information to each RN through a specific partition. That is, the relay zone configuration information transmitted by the eNode B may include a bitmap indication field indicating whether each partition of a backhaul subframe is used as a relay zone or is used as a PDSCH for macro UEs and configuration information (for example, the number of OFDM symbols allocated to an R-PDDCH and the like) of an R-PDSCH and an R-PDCCH of a partition used as a relay zone. Here, the configuration information of the relay zone may be transmitted together with an R-PDCCH and an R-PDSCH in a TDM manner or may be multiplexed and transmitted with aggregated control channel elements (CCEs) or a specific CCE in an R-PDCCH in a dedicated partition for the relay zone or may be multiplexed and transmitted with data in an FDM manner through an R-PDSCH region.

The eNode B may allocate dedicated R-PHICHs for all RNs that are supported through a corresponding backhaul subframe to an R-PDCCH region of a specific partition (for example, the partition 2) for the relay zone. Here, the eNode B may allocate the dedicated R-PHICHs such that the respective R-PHICHs for a plurality of RNs can be discriminated in the time and frequency domains and their codes (sequences) are also orthogonal. The eNode B may transmit such resource mapping and code mapping information to each RN through higher layer signaling or the like.

The eNode B may apply a codeword based ACK/NACK feedback scheme to a downlink HARQ ACK/NACK feedback for each RN and may transmit the codeword based ACK/NACK feedback to the RN through a dedicated partition for the relay zone. To accomplish this, the eNode B may multiplex and transmit an R-PHICH for ACK/NACK feedback codeword transmission with an R-PDCCH and an R-PDSCH of the corresponding partition in a TDM manner or may transmit the R-PHICH for ACK/NACK feedback codeword transmission using aggregated control channel elements (CCEs) or a specific CCE in an R-PDCCH or may multiplex and transmit the R-PHICH for ACK/NACK feedback codeword transmission with backhaul data in an FDM manner. Here, the eNode B may transmit R-PHICH resource mapping information in the corresponding partition to each RN through higher layer signaling or the like.

The eNode B may transmit an ACK/NACK feedback field for uplink backhaul transmission of the corresponding RN by incorporating the ACK/NACK feedback field into downlink or uplink grant information for the RN in an R-PDCCH instead of in an R-PHICH.

The eNode B may signal an ACK/NACK feedback for the RN after performing a procedure for generating an ACK/NACK feedback code block, attaching a CRC to the code block, and masking the CRC with a corresponding RN ID. The eNode B may transmit ACK/NACK feedback information of one RN through one ACK/NACK feedback code block and may also transmit ACK/NACK feedback information of a plurality of RNs through one ACK/NACK feedback code block.

In the case where a specific partition (for example, the partition 3) is used as a relay zone, the eNode B may transmit a Relay_Physical Control Format Indicator CHannel (R-PCFICH) through a logical area or physical area starting point of an R-PDCCH of the specific partition. Alternatively, the eNode B may transmit the R-PCFICH at a fixed position in an R-PDCCH. Here, the R-PCFICH may include information regarding an R-PHICH configuration of the corresponding partition and the size of the R-PDCCH. The R-PHICH configuration information of the corresponding partition may include the number of R-PHICH groups, an R-PHICH length (or duration), the number of RNs to which an ACK/NACK feedback is provided through the R-PHICH of the corresponding partition, and the like. This allows each RN to determine whether or not an R-PHICH destined for the RN is present in the corresponding partition and to obtain resource mapping information.

All RNs, which blank an access link transmission to the UE in a specific backhaul subframe and receive a backhaul link from the eNode B, can determine that a specific partition is used as a relay zone through the R-PCFICH. To accomplish this, the eNode B attaches a CRC to an R-PCFICH and masks the CRC with a cell common RN ID to allow all RNs to decode it. The cell common RN ID is shared by all RNs that are attached to the macrocell. The eNode B may transmit the cell common RN ID to each RN during an initial setting procedure such as network entry of the RN.

Figure 6:
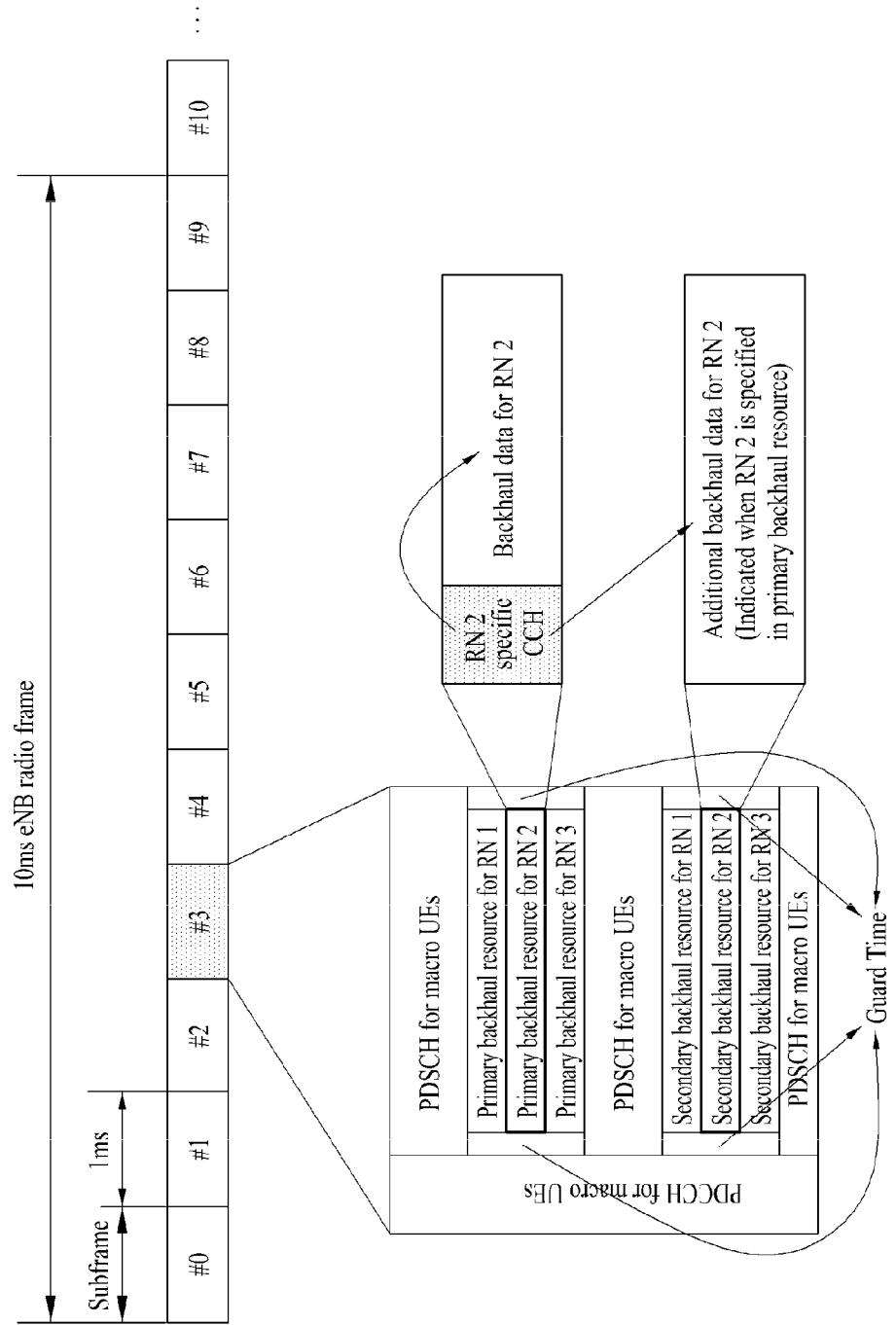
FIG. 6 illustrates an example of a backhaul subframe structure including a backhaul resource for an RN.

FIG. 6 illustrates an example of a backhaul subframe structure including a backhaul resource for an RN.

As shown in FIG. 6, a primary backhaul resource and a secondary backhaul resource may be allocated to each RN in a backhaul subframe whose index is 3. That is, the eNode B may allocate primary backhaul resources to different frequency bands for an RN 1, an RN 2, and an RN 3. The primary backhaul resource of each RN may include backhaul data to each RN and a control channel (CCH) specific to the RN. In the RN specific control channel, an R-PHICH and an R-PDCCH (downlink or uplink grant and Transmit Power Control (TPC) commands) may be multiplexed and transmitted in a TDM manner, in an FDM manner, or in a hybrid manner of TDM and FDM.

<R-PHICH Transmission and Resource Mapping Method in Dynamic Resource Allocation Method>

It is possible to support transmission of a plurality of code blocks in R-PUSCH transmission from an RN to an eNode B. As a method similar to PHICH transmission in the LTE system, it is possible to consider a method in which the eNode B sets an R-PHICH group on the same resource elements (REs) and multiplexes a plurality of R-PHICHs in the group using orthogonal sequences (for example, Walsh sequences).

Specifically, in a method of mapping resources for R-PHICH transmission, the eNode B may transmit a specific subset of REs by mapping the specific subset of REs to a resource space for transmission of a specific R-PHICH group in a cell-specific (or RN-common) search space. The specific subset of REs may have a fixed position in a cell-specific or semi-specific manner and the eNode B may transmit the subset to each RN through RN-specific or cell-specific signaling. Here, although it is preferable that the eNode B allocate the RN-common search region (or search space) in a semi-static manner, it is also possible to dynamically allocate the RN-common search region taking into consideration a scheduling gain of the UE. When a part of the RN-common search region is used for downlink ACK/NACK signal transmission, the overall size of allocated resources may be fixed while the size of the actual subset varies depending on the size of the RN-common search region.

R-PHICH mapping for R-PUSCH transmission may be implicitly performed according to a specific resource block (RB) index at which R-PUSCH transmission is performed in a specific RN (for example, according to the lowest RB index). However, in the case where a specific RN transmits a plurality of code blocks on the same RBs, the eNode B may transmit a bundle of ACK/NACK feedbacks to the RN. A resource in which the ACK/NACK is transmitted may be determined based on an RB index at which a downlink or uplink grant has been transmitted. In the case where the RN transmits multiple carriers or multiple codewords in uplink, the eNode B may select a number of resources (i.e., R-PHICHs) for use in ACK/NACK feedback transmission, the number of resources corresponding to the number of the multiple carriers or the multiple codewords, consecutively or according to a predetermined rule.

Then, the eNode B may allocate an RN-specific R-PHICH for each RN. The number of R-PHICHs allocated to a specific RN may be determined according to the maximum number of codewords that can be transmitted by the corresponding RN through an R-PUSCH and according to whether a corresponding ACK/NACK feedback scheme (in which an individual ACK/NACK feedback is applied for each codeword) is applied or a bundled ACK/NACK feedback scheme is applied. In the case where a plurality of R-PHICHs is allocated to the RN, it is possible to allocate different orthogonal sequences within the same R-PHICH group or to allocate specific sequences in different R-PHICH groups. The eNode B may notify each RN of RN-specific R-PHICH allocation information through RN-specific RRC signaling or the like. Here, in a method of allocating a resource for each RN, the resource may be determined based on an ID of the RN. Alternatively, the eNode B may notify the RN of predetermined information through higher layer signaling or L1/L2 signaling. The method of setting resources for specified ACK/NACK transmission described above may be applied to both the cases where a resource reserved for an RN can be shared by a number of RNs and where a resource reserved for an RN can be selectively used by a number of RNs.

In another exemplary resource mapping for R-PHICH transmission, an R-PDCCH for a specific RN may be configured within transmitted RBs in a TDM or FDM manner or may be configured in a hybrid manner of TDM and FDM depending on the number of RBs. For example, in the case where an RN has detected an R-PDCCH (for example, a downlink/uplink grant or a TPC command) in an OFDM symbol of index 3 of a specific RB(s) through blind search, R-PHICH transmission is performed through specific consecutive or predefined OFDM symbol(s) of the RBs or some of the RBs. That is, in the case where the R-PHICH duration is 2, R-PHICH transmission is performed through OFDM symbols of indices 4 and 5 (or through OFDM symbol(s) of specific indices that have been predefined, for example, through OFDM symbols of indices 11 and 12). Then, in the case where individual ACK/NACK feedbacks are provided for a plurality of code blocks, respective ACK/NACK feedbacks of the code blocks may be transmitted through different orthogonal sequences. In the case where an R-PDCCH for the RN is not present although an R-PHICH for the RN is present, the eNode B may transmit a dummy R-PDCCH to the RN to notify the RN of the position of the R-PHICH.

<Downlink HARQ ACK/NACK Feedback Through Downlink or Uplink Grant>

An ACK/NACK feedback, which the eNode B provides in response to uplink backhaul transmission from an RN, may be transmitted within a downlink or uplink grant to the RN. The eNode B may also configure and transmit an R-PDCCH including an ACK/NACK signal alone.

One example of a downlink HARQ ACK/NACK feedback method through a downlink or uplink grant is a determination method according to an implicit indication in a grant. That is, the RN may identify an ACK/NACK for uplink backhaul traffic based on whether or not an R-PDCCH corresponding to an uplink grant is present, whether or not a Downlink Control Information format corresponding to an uplink grant is present, the type of a DCI format, the decoding position of the R-PDCCH, or the like.

For example, in order to indicate an NACK signal, the eNode B may not transmit a corresponding R-PDCCH in a next uplink grant or may transmit a DCI format which does not include an uplink grant. Alternatively, the RN may identify an ACK/NACK through blind decoding based on physical/logical region start positions of different R-PDCCHs. For example, the RN may identify an ACK when the physical/logical region start position is a CCE of index 2 and identify an ACK when the physical/logical region start position is a CCE of index 10. Alternatively, the eNode B may define different DCI formats which can indicate ACK/NACK states and selectively transmit one of the DCI formats to allow the RN to identify an ACK/NACK signal by identifying the DCI format. However, it is also possible to define and use different CRC-mask values according to ACK/NACK without defining different DCI formats to allow the RN to identify the ACK/NACK. For example, in the case where the eNode B has allocated 2 IDs to one RN, the RN can identify an ACK if the first ID is CRC-masked and transmitted to the RN and identify a NACK if the second ID is CRC-masked and transmitted to the RN.

In the case where ACKs/NACKs for multiple codewords or multiple subframes are simultaneously applied, it is possible to indicate multiple ACK/NACK states by applying bundling or by using an R-PDCCH position.

<Identification of Grant Field According to New Data Indicator (NDI)>

The RN may identify an ACK/NACK for uplink backhaul data using grant information. The RN may identify an ACK/NACK by detecting a change that is made when a new packet is transmitted. For example, the RN may determine that the signal is an ACK signal when a modulation and coding scheme (MCS) has been changed at a redundancy version (RV) value of 0 and determine that the signal is a NACK signal when the MCS has been set to an index at which only the RV value is changed. In another ACK/NACK indication method, the RN may identify an ACK when a New Data Indicator (NDI) value is set as new data transmission (i.e., when the NDI value is changed) and identify a NACK when the NDI value is set as retransmission (i.e., when the NDI value remains unchanged). It is preferable that this method be applied when the number of codewords is 1 or when the number of ACKs/NACKs to be transmitted is 1 or when a number of ACKs/NACKs are bundled.

To indicate an ACK/NACK associated with multiple codewords or multiple subframes, it is possible to use a Downlink Assignment Index (DAI) value or an uplink index value. This value is effective when the NDI value does not indicate a new data value.

<Method of Transmitting ACK/NACK Signal for Uplink Data Transmission Through Grant>

The following is a description of a method of identifying an ACK/NACK signal according to the bit pattern of a grant. A sufficient information space is required to indicate an ACK/NACK signal. Here, remaining grant fields other than a grant field indicating an ACK/NACK signal may be meaningless. The remaining bits may be reconfigured for other purposes if an NDI value does not indicate new data although the same codeword duration is maintained. Accordingly, it is possible to simply reconfigure a specific field as bits for an ACK/NACK signal and the number of the bits may be set to the number of ACK/NACK bits that need to be transmitted at once. However, all remaining unused bits may be set to a specific known value and bit fields that are also available in a retransmission state may be dynamically changed so as to transmit an ACK/NACK signal.

The eNode B may simultaneously transmit a downlink grant and an uplink grant. In this case, only a valid grant among the downlink and uplink grants may be defined and only a specific part of the remaining grant may be used as an ACK/NACK bit field. Here, it is possible to redefine a bit field used to indicate whether a downlink grant or an uplink grant is present. For example, 1 bit may be set as the bit field such that one value of the 1 bit indicates that both uplink and downlink grants are present and the other value indicates that only one of the uplink and downlink grants is present. In another method, in the case where the bit field includes 2 bits, 1 bit may be configured to indicate that a downlink grant is present and the other 1 bit may be configured to indicate that an uplink grant is present. Here, a grant that is not used among the downlink and uplink grants may be reconfigured for fields and may then be used for ACK/NACK transmission as described above.

<Method of Applying ACK/NACK Transmission According to HARQ Mode>

In the case where a transmission mode of RN uplink backhaul traffic is asynchronous, an uplink grant for retransmission needs to be always present. Accordingly, in the case where a NACK signal is transmitted, the uplink grant has a form in which it is always transmitted together with the NACK signal. Here, detailed information of the NACK signal may follow the previously described details. However, it is necessary to employ a format in which a PDCCH is always transmitted to transmit an ACK/NACK signal in order to cope with the case where a grant is not present while an ACK signal is transmitted. In addition, it is possible to define an R-PDCCH having a format in which it includes only ACK information without grant information in the case where uplink scheduling is not present.

In the case where the transmission mode of RN uplink backhaul traffic is synchronous, an uplink grant for retransmission is generally not transmitted. However, it is also possible to transmit an uplink grant for ACK/NACK signal transmission and to configure the grant in a manner described above. However, in the case where an uplink grant is not transmitted, ACK/NACK information may be transmitted within a downlink grant, which may be configured in the same manner as in the implicit grant indication method described above. However, if both the downlink and uplink grants are not present, there is a need to define a blind detection method for detecting a specific ACK/NACK signal. In this case, blind decoding complexity is increased and therefore it is preferable that a dummy grant among the downlink and uplink grants be transmitted and an ACK/NACK signal be transmitted in the grant.

Figure 7:
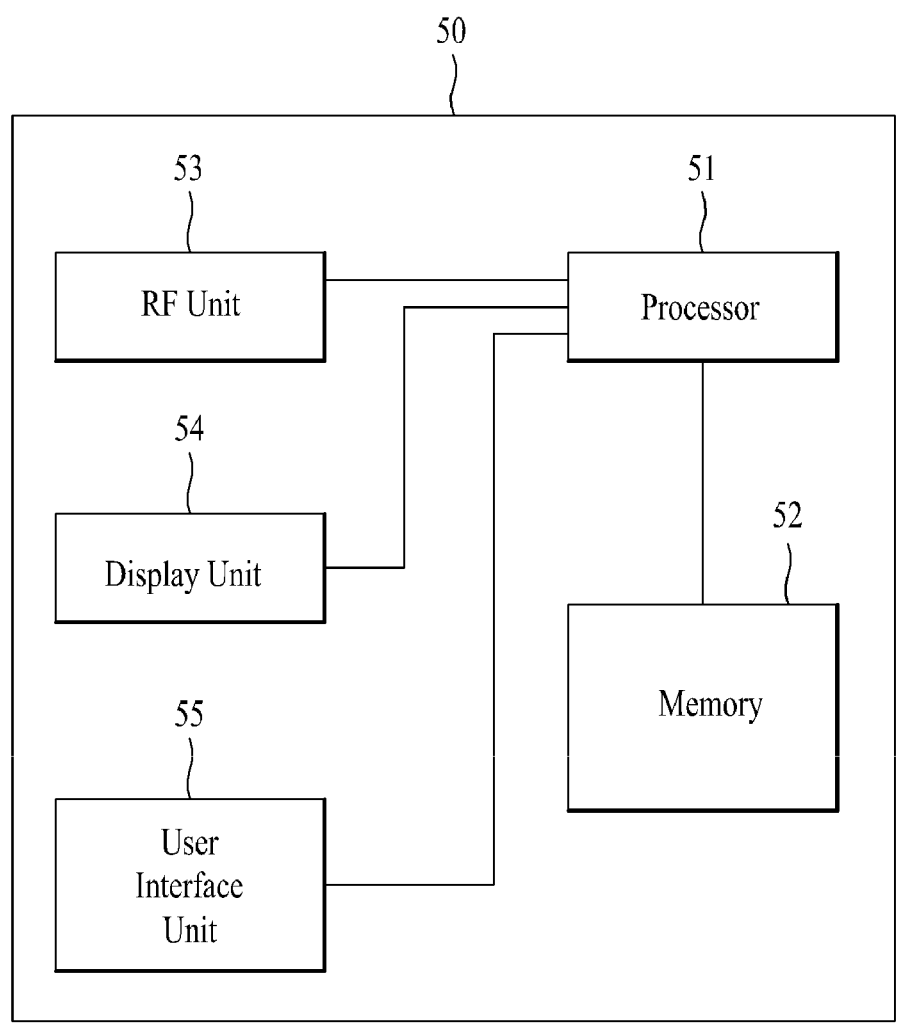
FIG. 7 is a diagram illustrating components of an apparatus 50 according to the present invention.

FIG. 7 is a diagram illustrating components of an apparatus 50 according to the present invention.

As shown in FIG. 7, the apparatus 50 may be a UE or an eNode B. The apparatus 50 includes a processor 51, a memory 52, a Radio Frequency (RF) unit 53, a display unit 54, and a user interface unit 55.

Layers of a radio interface protocol are implemented in the processor 51. The processor 51 provides a control plane and a user plane. Functions of each layer may be implemented in the processor 51. The memory 52 is connected to the processor 51 to store an operating system, applications, and general files.

The display unit 54 may display various information and may include a well known element such as a Liquid Crystal Display (LCD) or an Organic Light Emitting Diode (OLED).

The user interface unit 55 may be configured as a combination of well known user interfaces such as a keypad and a touch screen.

The RF unit 53 may be connected to the processor 51 to transmit and receive radio signals. The RF unit 53 may be divided into a transmission module (not shown) and a reception module (not shown).

Layers of the radio interface protocol between the UE and the network may be classified into a first layer (L1), a second layer (L2), and a third layer (L3) based on the 3 layers of the well known Open System Interconnection model in communication systems. The physical layer belongs to the first layer and provides an information transmission service through a physical channel. A Radio Resource Control (RRC) layer belongs to the third layer and provides radio resources between the UE and the network. The UE and the network exchange RRC messages through the RRC layer.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The method for an RN to receive an HARQ ACK/NACK feedback signal from an eNode B is applicable to a mobile communication system such as an LTE, LTE-A, or IEEE 802.16m system.

The invention claimed is:

1. A method for detecting a Hybrid Automatic Repeat reQuest (HARQ) ACKnowledgement/Negative ACKnowledgement (ACK/NACK) feedback signal at a specific relay node (RN) in a mobile communication system, the method comprising:
receiving specific channel configuration information from an evolved Node B (e Node B), the specific channel configuration information including a starting point of a Physical Hybrid ARQ Indicator Channel (PHICH) zone dedicated to a plurality of RNs including the specific RN and offset information indicating a position of a specific PHICH within the PHICH zone, the specific PHICH dedicated to the specific RN;
receiving the HARQ ACK/NACK feedback signal from the eNode B for uplink transmission via the PHICH zone;
detecting the specific PHICH based on the received specific channel configuration information; and
decoding the received HARQ ACK/NACK feedback signal,
wherein a number of PHICH entities within the PHICH zone corresponds to a number of RNs that are supported by a backhaul subframe to which the PHICH zone is allocated.

2. The method according to claim 1, further comprising:
receiving at least predefined code index information for the HARQ ACK from the eNode B; and
determining whether the received HARQ ACK/NACK feedback signal is an ACK or a NACK based on the predefined code index information and a code index applied to the received HARQ ACK/NACK feedback signal.

3. The method according to claim 1, wherein a starting point of the specific PHICH is indicated by a Resource Block (RB) index.

4. The method according to claim 1, wherein the received HARQ ACK/NACK feedback signal corresponds to each of a plurality of multiple layers when uplink transmission by the specific RN is transmission of a plurality of code blocks through the plurality of multiple layers.

5. The method according to claim 1, wherein the PHICH zone is included in a physical downlink control channel for the specific RN.

6. A Relay Node (RN) apparatus for detecting a Hybrid Automatic Repeat reQuest (HARQ) ACKnowledgement/

Negative ACKnowledgement (ACK/NACK) feedback signal in a mobile communication system, the RN apparatus comprising:

a Radio Frequency (RF) unit for:
receiving specific channel configuration information from an evolved Node B (eNode B), the specific channel configuration information including a starting point of a Physical Hybrid ARQ Indicator Channel (PHICH) zone dedicated to a plurality of RNs including the RN apparatus and offset information indicating a position in a specific PHICH within the PHICH zone, the specific PHICH dedicated to the RN apparatus; and
receiving the HARQ ACK/NACK feedback signal from the eNode B for uplink transmission; and a processor for:
detecting the specific PHICH based on the received specific channel configuration information; and
decoding the received HARQ ACK/NACK feedback signal, wherein a number of PHICH entities within the PHICH zone corresponds to a number of RNs that are supported by a backhaul subframe to which the PHICH zone is allocated.

7. The RN apparatus according to claim 6, wherein:
the RF unit is further for receiving at least predefined code index information for the HARQ ACK from the eNode B; and
the processor is further for determining whether the received HARQ ACK/NACK feedback signal is an ACK or a NACK based on the predefined code index information and a code index applied to the received HARQ ACK/NACK feedback signal.

8. The RN apparatus according to claim 6, wherein a starting point of the specific PHICH is indicated by a Resource Block (RB) index.

9. The RN apparatus according to claim 6, wherein the received HARQ ACK/NACK feedback signal corresponds to each of a plurality of multiple layers when uplink transmission by the RN apparatus is transmission of a plurality of code blocks through the plurality of multiple layers.

10. The RN apparatus according to claim 6, wherein the PHICH zone is included in a physical downlink control channel for the RN apparatus.

* * * * *